United States Patent
Judge et al.

(10) Patent No.: US 7,373,530 B2
(45) Date of Patent: May 13, 2008

(54) SYSTEMS AND METHODS FOR PROVIDING POWER-LOSS PROTECTION TO SLEEPING COMPUTERS SYSTEMS

(75) Inventors: Nicholas Stephen Judge, Bellevue, WA (US); Jacob Oshins, Seattle, WA (US); Stephane Plante, Kirkland, WA (US); Andrew J. Ritz, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 362 days.

(21) Appl. No.: 11/083,256

(22) Filed: Mar. 16, 2005

(65) Prior Publication Data
US 2006/0212727 A1    Sep. 21, 2006

(51) Int. Cl.
*G06F 1/00*   (2006.01)
*G06F 1/26*   (2006.01)
(52) U.S. Cl. ...................... 713/300; 713/320
(58) Field of Classification Search ................. 713/300
See application file for complete search history.

(56) References Cited

U.S. PATENT DOCUMENTS

| | | | |
|---|---|---|---|
| 6,389,556 B1 * | 5/2002 | Qureshi | 714/15 |
| 7,100,062 B2 * | 8/2006 | Nicholas | 713/323 |
| 2002/0073358 A1 * | 6/2002 | Atkinson | 714/21 |

* cited by examiner

Primary Examiner—James K. Trujillo
Assistant Examiner—Stefan Stoynov
(74) Attorney, Agent, or Firm—Woodcock Washburn LLP

(57) ABSTRACT

Transitioning to a suspend to RAM sleeping state while also protecting against power losses while sleeping is provided. System state context data is saved to non-volatile storage and components in the computer system prepare to transition to a suspend to disc sleeping. A transition to the suspend to RAM sleeping state is then effected. Alternatively, after the system context is saved and the components are prepared to transition, the system may wake to a working state. The components may be directed to prepare for transitioning to a suspend to RAM sleeping state, and then the BIOS may be directed to execute the transition. In either embodiment, if power to the system is lost while the system is in the suspend to RAM system state, then the system may resume to a working state by reading the context file stored to non-volatile storage.

17 Claims, 5 Drawing Sheets

SYSTEMS AND METHODS FOR PROVIDING POWER-LOSS PROTECTION TO SLEEPING COMPUTERS SYSTEMS

FIELD OF THE INVENTION

The invention generally relates to the field of computer system standby states and specifically to sleeping system states.

BACKGROUND OF THE INVENTION

A computer system typically may be in one of many standby states, including "sleeping" states. An open industry specification called Advanced Configuration and Power Interface (ACPI) establishes industry-standard interfaces for configuration and power management directed by computer operating systems. The ACPI establishes system sleeping states, commonly designated, "S1," "S2," "S3," and "S4," with each sleeping state defined to allow implementations that can tradeoff cost, power, and wake latencies. Additionally, the ACPI specification defines the sleeping states such that a system can support multiple sleeping states, allowing the system to transition into a particular sleeping state for a predefined period of time and then transition to a lower power/higher wake latency sleeping state.

The S1 sleeping state is a low wake latency sleeping state, and in this state no system context is lost and hardware maintains all system context. System context generally is the volatile data in the system that is not saved by a device driver. The S2 sleeping state is a low wake latency sleeping state similar to the S1 sleeping state except that a state of a central processing unit (CPU) and system cache typically are lost and control starts from the CPU's reset vector after a wake event. The S3 sleeping state is another low wake latency sleeping state where typically all system context, CPU state, cache, and chip set context are lost, and only system memory is maintained. During the S3 sleeping state, hardware maintains memory context and restores some CPU configuration context. Control starts from the CPU's reset vector after a wake event.

During the S1, S2, and S3 sleeping states, power to RAM is maintained, and therefore, each of these sleeping states may be referred to as "suspend to RAM" sleeping states. The S4 sleeping state is the lowest power, longest wake latency sleeping state supported by the ACPI. To reduce power to a minimum, it is assumed that the hardware platform has powered off all devices, and the platform context is maintained. In the S4 sleeping state, power to RAM may be eliminated, and the system context is stored to disc or other non-volatile storage. Therefore, the S4 sleeping state may be referred to as a "suspend to disc" sleeping state. The ACPI also defines a system state S0, which is a system working state.

The latency period for waking a system in a suspend to RAM sleeping state, such as the S1, S2, or S3 sleeping state, is shorter than for a system in the suspend to disc sleeping state, such as the S4 sleeping state. The delay involved in transitioning to a working state from a suspend to disc state may create a disincentive to placing a computer in the suspend to disc state. The user, for example, may prefer a suspend to RAM sleeping state so that resuming to a working state may occur more rapidly than from a suspend to disc sleeping state.

A problem with choosing a suspend to RAM sleeping state over a suspend to disc sleeping state, however, arises if power to the system is lost. Because the system context is written to RAM for the suspend to RAM sleeping states, power is needed to maintain the system context in RAM. If power is lost while a system is in the, for example, S3 sleeping state, the context will be lost, and a full or lengthy boot process may be required. Moreover, any work in progress may be lost.

If, however, a system in the suspend to disc sleeping state (e.g., the S4 state) loses power, upon regaining power, the system wakes normally. This is because the system context was previously written to non-volatile storage. FIG. 1 depicts a flow diagram of a typical method 10 for transitioning from a working state such as the S0 state to a suspend to disc state, such as the S4 sleeping state. The method 10 includes transitioning to the suspend to disc state in a system that subsequently loses power. The loss of power is indicated by the dashed line 15. The method 10 also includes transitioning to the working state after regaining power, shown as the steps below the dotted line 15.

At step 11, device drivers or components in a system are notified that the system will be transitioning to the S4 sleeping state. This step may occur after the operating system queries application programs and device drivers of the viability of transitioning to a sleep state and after the operating system receives indications that the applications and drivers are ready for the transition. Alternatively, the operating system may tell the applications and/or the device drivers of the transition without first asking. At step 11, each device driver saves its state. At step 12, a context file comprising the context of the system may be written. The operating system may write the context file. At step 13, the operating system may communicate with firmware containing basic routines that help to transfer information between elements within the computer during, for example, start-up, sleep, or shut-down operations. The firmware may be a basic input/output system (BIOS). The operating system may direct the BIOS or other firmware or hardware to transition to the S4 sleeping state. At step 14, power to the system is lost.

At step 16, power is regained. Upon regaining power, the system reads the context file at step 17. At step 18, the operating system may restore the system to the working state it was in before entering the S4 sleeping state (i.e., before step 11).

In some systems, when a BIOS is notified of a transition to a suspend to RAM state, such as the S1, S2, or S3 states, the BIOS may write a system context file to non-volatile storage even if another entity, such as an operating system, has saved state to RAM. If the BIOS writes this file and, while in the suspend to RAM state, power is lost, the BIOS file may be used to wake the system when power is regained. Problems may arise, however, with attempting to wake the system with the BIOS context file because the BIOS may not have been aware of the current state of the system when creating the file. The system context that the BIOS saves to disc thus may not be reliable and may not reflect a current state of the system.

Therefore, there is a need for systems and methods for providing a reliable capability of a computer system to wake to a working state from a suspend to RAM sleeping state while safeguarding context information and work in progress in the event that the computer loses power while in the suspend to RAM state.

SUMMARY OF THE INVENTION

The invention is directed to methods and systems for transitioning to and awakening from a suspend to RAM sleeping state while providing protection against power failures that may occur during the suspend to RAM state. According to the invention, a computer system transitions to a suspend to RAM sleeping state while also preparing context data and saving state information to non-volatile storage. In this way, if power to the system in the suspend to RAM sleeping state is lost, thus resulting in a loss of context information stored in volatile RAM, the system still returns to the working state by reading the context file saved to non-volatile storage.

According to one aspect of the invention, the computer system performs preparations usually completed when the computer system transitions to a suspend to disc sleeping state. That is, system state context data is saved to non-volatile storage even though the computer system will be transitioning to a suspend to RAM system state. Likewise, components in the computer system may be told to prepare to transition to a suspend to disc sleeping even though the system is transitioning to a suspend to RAM sleeping state. The components will save state such that they can resume to the working state even if power is lost while in the suspend to RAM sleeping state. After the system context is saved to non-volatile storage and the components are prepared to transition to a suspend to disc sleeping state, the BIOS or hardware is directed to transition to the suspend to RAM sleeping state.

According to an alternative aspect of the invention, after the system context is saved and the components are prepared to transition to a suspend to disc sleeping state, the system may wake to a working state. After waking, the drivers or components may be directed to prepare for transitioning to a suspend to RAM sleeping state, and then BIOS program code or hardware may be invoked to effect the transition.

If power to the system is lost while the system is in the suspend to RAM system state, then the system may resume to a working state by reading the context file stored to non-volatile storage. The system may then remain in a working state or transition back to the suspend to RAM sleeping state.

BRIEF DESCRIPTION OF THE DRAWINGS

The foregoing summary and the following detailed description of the invention are better understood when read in conjunction with the appended drawings. Embodiments of the invention are shown in the drawings, however, it is understood that the invention is not limited to the specific methods and instrumentalities depicted therein. In the drawings.

DETAILED DESCRIPTION OF ILLUSTRATIVE EMBODIMENTS

Example Computing Environment

Figure 1:
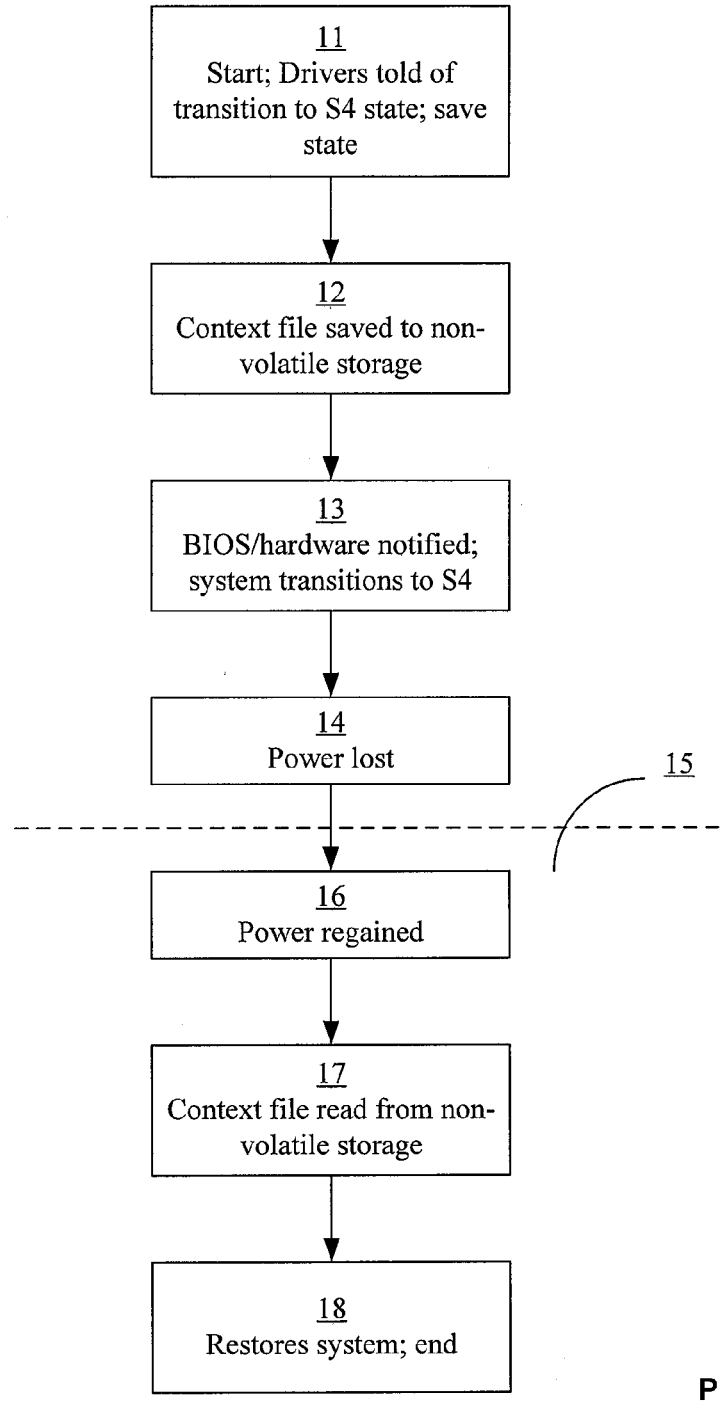
FIG. 1 depicts a flow diagram of a method for transitioning from a working state to a suspend to disc sleeping state and back to the working state when power to the system is lost and regained.
Figure 2:
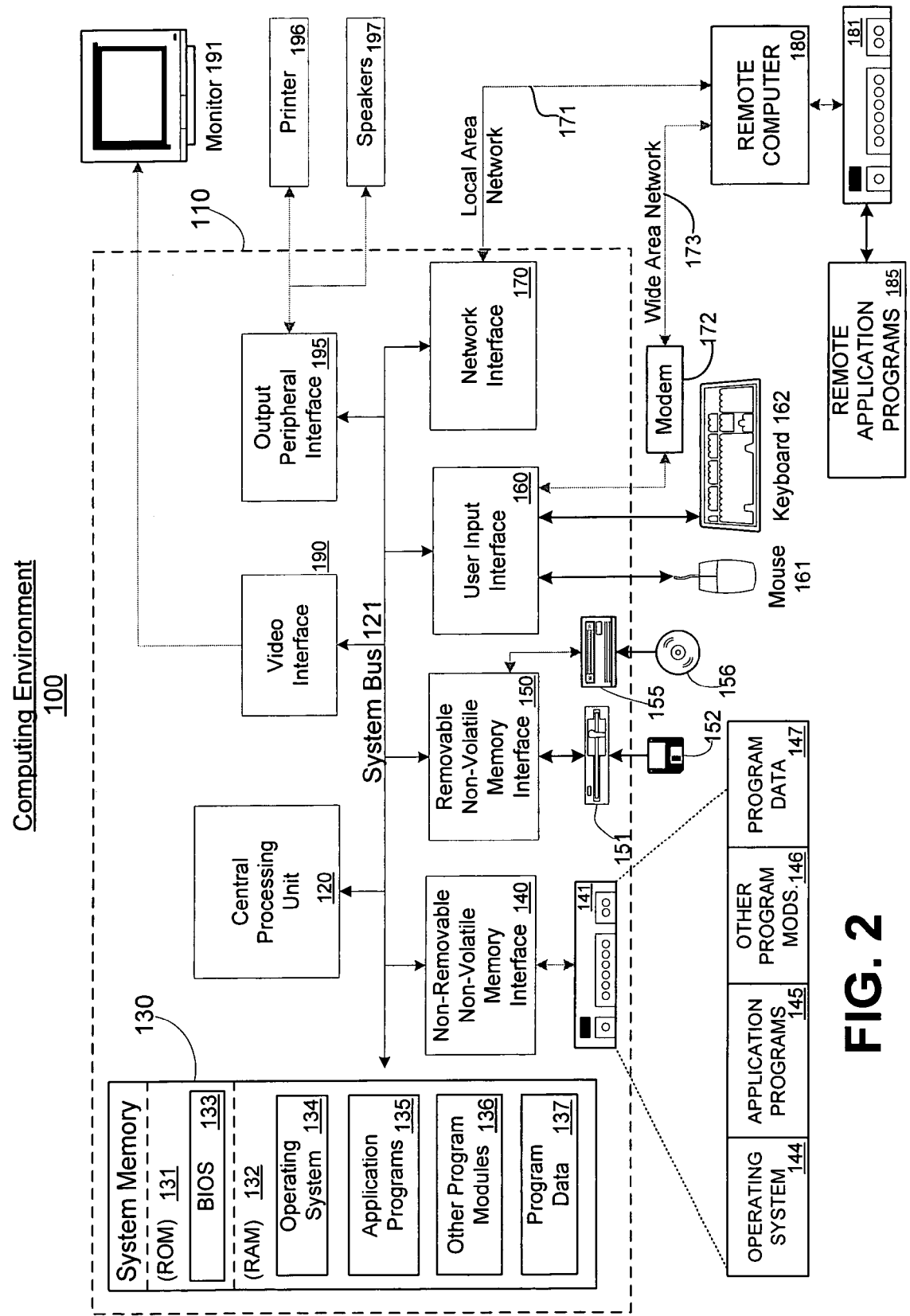
FIG. 2 is a block diagram showing an example computing environment in which aspects of the invention may be implemented.

FIG. 2 and the following discussion are intended to provide a brief general description of a suitable computing environment 100 in which an example embodiment of the invention may be implemented. As used herein, the terms "computing system," "computer system," and "computer" refer to any machine, system or device that comprises a processor capable of executing or otherwise processing program code and/or data. Examples of computing systems include, without any intended limitation, personal computers (PCs), minicomputers, mainframe computers, thin clients, network PCs, servers, workstations, laptop computers, hand-held computers, programmable consumer electronics, multimedia consoles, game consoles, satellite receivers, set-top boxes, automated teller machines, arcade games, mobile telephones, personal digital assistants (PDAs) and any other processor-based system or machine. The terms "program code" and "code" refer to any set of instructions that are executed or otherwise processed by a processor. "Program modules" include routines, programs, objects, components, data structures and the like that perform particular tasks or implement particular abstract data types. Typically, the functionality of the program modules may be combined or distributed as desired in various embodiments.

The term "kernel" refers to any form of code executing on a processor to control the operation of a computing system, including without limitation traditional operating system kernels, such as the kernels of the WINDOWS® family of operating systems available from Microsoft Corporation, the kernel of the MACINTOSH® operating system available from Apple Computer, Inc. and the LINUX kernel.

The term "component" refers to any hardware component or device that is within a computer or that is peripheral to and in communication with the computer. A device driver refers to any program code that at least in part controls a component of a computer system. A device driver may access hardware registers of the component and additionally may save a state of the component under certain circumstances, such as upon receiving a notification that the computer system will be transitioning to sleeping state. Device drivers often form part of the lowest level of the kernel, with which they may be linked when the kernel is built or installed from a file after a system is running.

The terms "state" and "context" refer to configuration, attributes, condition, or content of a computer system or components or devices of the computer system. The term "firmware" refers to program code stored in read-only memory (ROM) or programmable ROM (PROM).

While a general purpose computer is described below, this is but one example. The present invention also may be operable on a thin client having network server interoperability and interaction. An example embodiment of the invention may be implemented in an environment of networked hosted services in which very little or minimal client resources are implicated, e.g., a networked environment in which the client device serves merely as a browser or interface to the World Wide Web. Although not required, the invention can be implemented via an application programming interface (API), for use by a developer or tester, and/or included within the network browsing software.

The invention may be implemented in the form of computer-executable instructions, such as program modules, being executed by one or more processors of a computers system. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 2 illustrates an example of a suitable computing system environment 100 in which the invention may be implemented, although as made clear above, the computing system environment 100 is only one example of a suitable computing environment and is not intended to suggest any limitation as to the scope of use or functionality of the invention. Nor should the computing environment 100 be interpreted as having any dependency or requirement relating to any one or combination of components illustrated in the exemplary operating environment 100.

With reference to FIG. 2, an example system for implementing the invention includes a general purpose computing device in the form of a computer 110. Components of computer 110 may include, but are not limited to, a central processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above are also included within the scope of computer readable media.

The system memory 130 includes computer storage media in the form of volatile and/or nonvolatile memory such as ROM 131 and RAM 132. A basic input/output system 133 (BIOS) containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2 provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

A computer 110 or other client device can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Example Embodiments

Figure 3A:
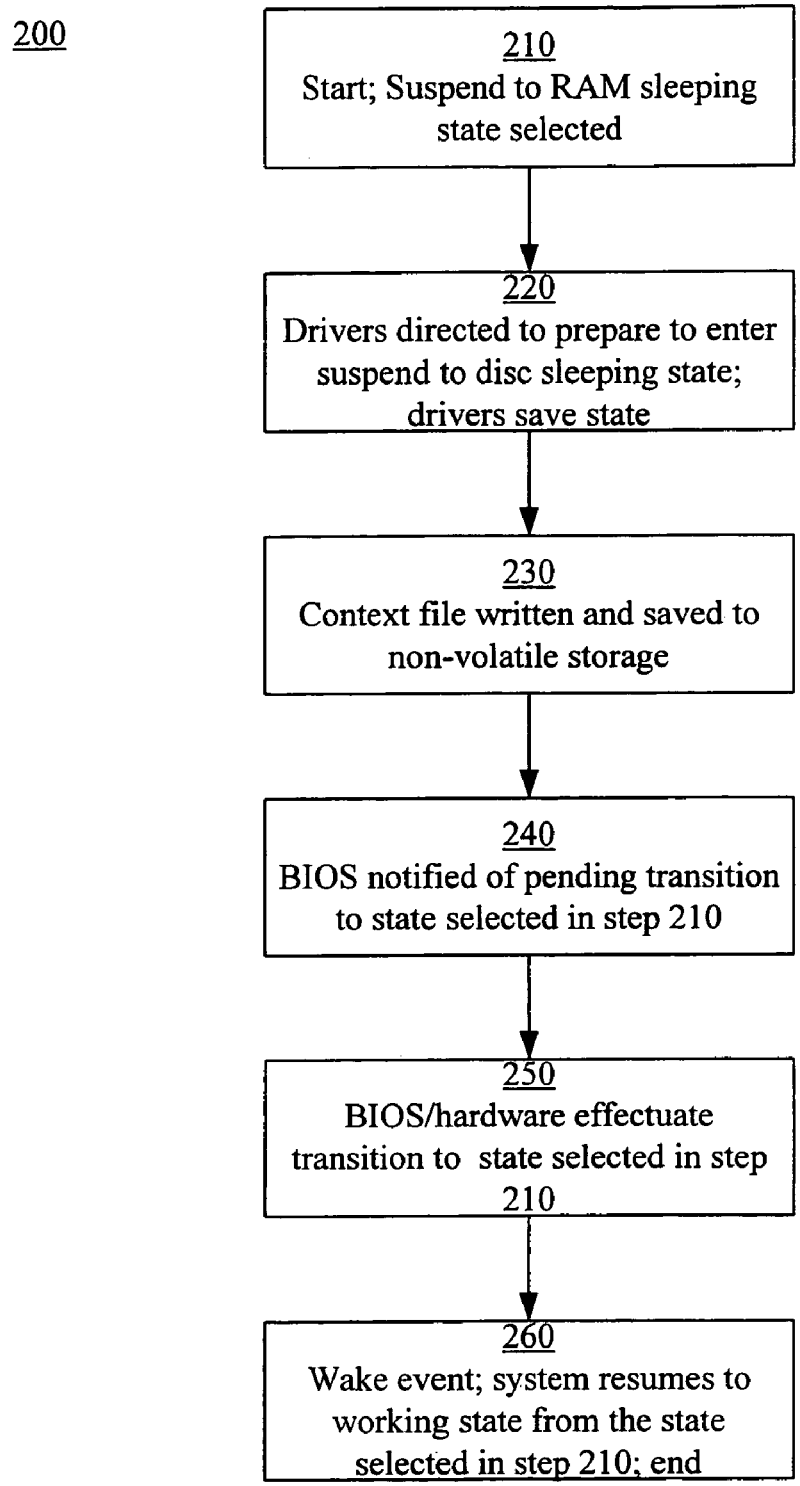
FIG. 3A depicts a flow diagram of an example method for entering a suspend to RAM sleeping state with power-loss protection according to the invention.

FIG. 3A depicts a flow diagram of one embodiment of a method 200 for entering a suspend to RAM sleeping state with power-loss protection according to the invention. A suspend to RAM sleeping state refers to a sleeping state during which power to RAM is maintained. Such a sleeping state may correspond to the ACPI states S1, S2, or S3. It will be recognized, however, that the method 200 and other methods described herein are not limited to the ACPI specification or the sleeping states defined therein. Embodiments of the invention may be applied to protect against power failures in any system in which power to RAM is normally maintained during sleeping states.

The method 200 starts at step 210 with a user selecting a system suspend to RAM sleeping state. Alternatively, the method 200 may commence absent a user selection of a sleeping state. For example, a system may be preprogrammed to enter a suspend to RAM sleeping state after a predetermined amount of time of inactivity has elapsed. After such a sleeping state has been selected, components in the system typically would be directed to prepare for a transition to the selected sleeping state. According to the invention, however, at step 220, the components in the system are instead directed to prepare to enter a sleeping state in which the state of the computer system is saved to non-volatile storage. Such a sleeping state is herein referred to as a suspend to disc sleeping state because the state of the computer system is saved to non-volatile storage. Non-volatile storage includes magnetic discs, magnetic tapes, bubble memory or any other storage medium whose contents are preserved when its power is off. The sleeping state S4, for example, is a suspend to disc sleeping state. An operating system may provide the notification of step 220 to the components in the system, though it will be understood that the invention may be implemented in systems that do not include an operating system.

It will be recognized, then, that the components in the computer system are directed to prepare for a transition to a suspend to disc sleeping state when the system actually will be transitioning to a suspend to RAM sleeping state. This "deception" may be recognized by enlightened components. That is, enlightened components may recognize that the system will transition to a suspend to RAM sleeping state and that they are responsible for saving state and making any other preparations in the event that power is lost while in the suspend to RAM sleeping state. Therefore, there may be no deception on the part of such enlightened components. Embodiments of the invention may be implemented in systems with non-enlightened components or in systems with both enlightened and non-enlightened components. The device driver of each component will save the state of the component as if the system will be transitioning to a suspend to disc state rather than a suspend to RAM state. In this way, the device drivers and components will be able to resume, that is, return to the working state that they were in prior to the transition to the suspend to RAM sleeping state, if power to the system is lost while the system is in the suspend to RAM sleeping state.

At step 230, a context file is written and contains the system context, that is, the system state, at the time of transitioning to the suspend to RAM sleeping state. The system context may include volatile data in the system that is not saved by a device driver. The context file may be written by the operating system or another appropriate entity. After the system context file is written, it is saved to non-volatile storage, such as to disc or other non-volatile storage. The non-volatile storage may also be non-volatile RAM. It will be recognized, then, that during completion of steps 220 and 230, the components of the computer system may perform all functions typically completed in preparation for transitioning to a suspend to disc sleeping state.

At step 240, the system BIOS or other firmware capable of transitioning the system from a working to a sleeping state is notified of a pending transition to the state selected in step 210. It is understood that this notification may occur between other steps of the method 200. At step 250, the BIOS or other firmware is directed to transition to a suspend to RAM sleeping state, the waking from which typically can be performed without reading the context file stored in non-volatile storage. Alternatively, hardware of the system may be invoked directly to execute the transition. The BIOS or other firmware or hardware transitions to the selected suspend to RAM sleeping state as directed. The system may remain in the sleeping state until a wake event occurs at step 260. When a wake event occurs, the system may wake and resume to a working state such as the system state S0. If there has been no power loss, the system can wake and resume by reading the state saved to RAM.

In one embodiment, while performing the steps of the method 200, a timer in the computer system may be set that may trigger a transition from the suspend to RAM sleeping state to a suspend to disc sleeping state if, for example, no activity has occurred during a predetermined amount of time. Because the context file was written and stored to non-volatile storage prior to entering the suspend to RAM sleeping state, in this embodiment, power may be terminated as soon as the predetermined time has elapsed without requiring the computer system to wake to a working state and then transition to the suspend to disc state.

In another embodiment, a doze clock may be set to wake the computer system from the suspend to RAM sleeping state after a predetermined amount of time has elapsed. Setting a doze clock to wake the system allows running, for example, antivirus software or a defragmenter at a predetermined time. While preparing to transition to a suspend to RAM sleeping state, the computer system may set the timer for a transition to a suspend to disc sleeping state after determining the time until a next doze event (e.g., running antivirus software) so that power will not be lost or cut before the doze event occurs.

Figure 3B:
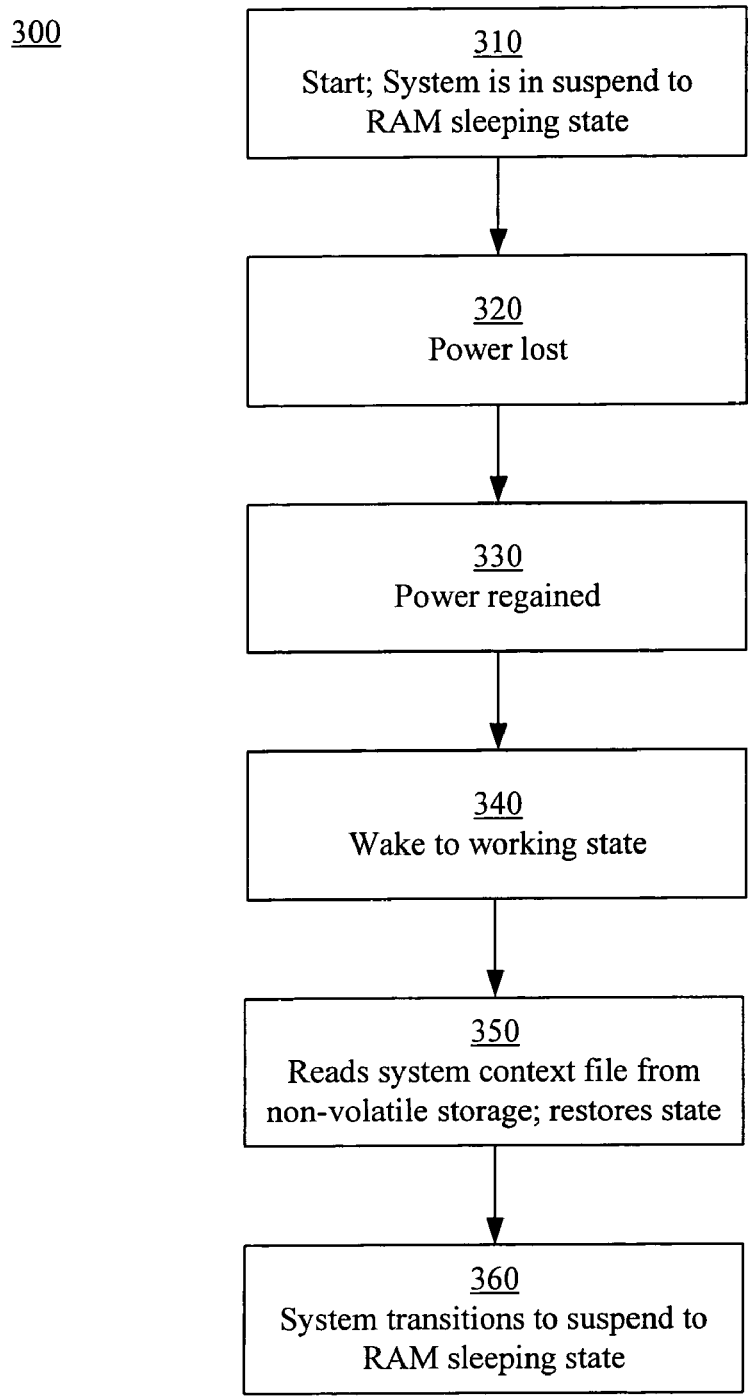
FIG. 3B depicts a flow diagram of an example method for transitioning to a suspend to RAM sleeping state after power to a system is lost while in the suspend to RAM sleeping state, according to the invention.

FIG. 3B depicts a flow diagram of an embodiment of a method 300 for transitioning back to a suspend to RAM sleeping state once power is regained after having been lost while in the suspend to RAM sleeping state, according to the invention. The method 300 may be performed in a system that previously entered a suspend to RAM sleeping state and that has saved a context file to non-volatile storage in accordance with the method illustrated in FIG. 2. At step 310, the method may start with the system in the suspend to RAM sleeping state. Power to the system may then be lost at step 320 and regained at step 330. The length of time during which power is lost can be of any duration. Upon regaining power, the system enters into a working state, such as the system state S0, at step 340. At step 350, an operating system or other appropriate mechanism reads the context file that was previously saved to non-volatile storage. At step 360, the system may again transition, using the method 200 described with regard to FIG. 3A or using other methods, to the suspend to RAM sleeping state that the system was in before power was lost. Alternatively, the system may remain in the working state, or may transition to another sleeping state depending on an evaluation of any predefined or predetermined criteria.

Figure 4:
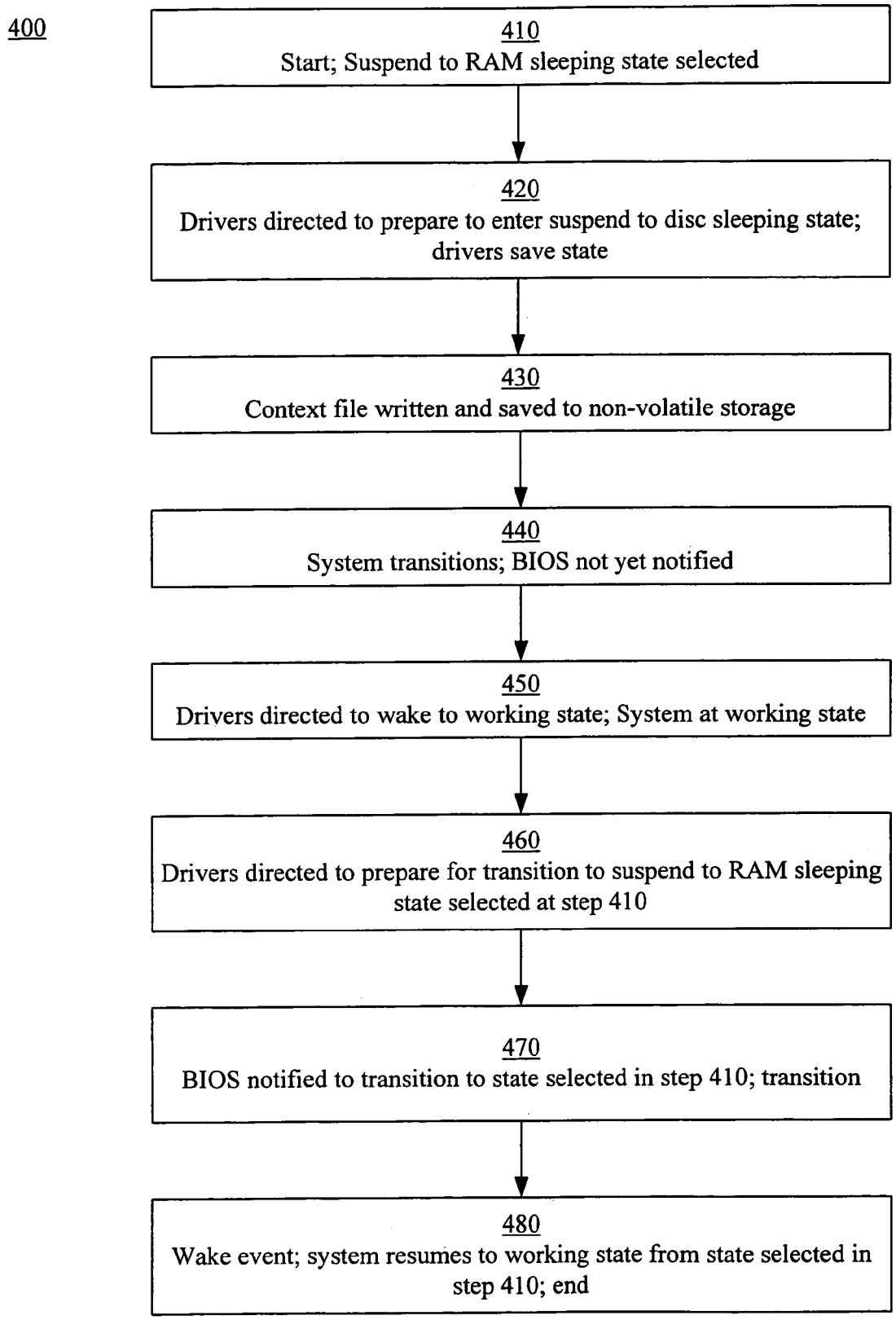
FIG. 4 depicts an alternative method for transitioning to a suspend to RAM sleeping state with power-loss protection according to the invention.

FIG. 4 depicts an alternative embodiment of a method 400 for entering a suspend to RAM sleeping state with power-loss protection according to the invention. Steps 410, 420, and 430 are essentially the same, respectively, as the steps 210, 220, and 230, described with regard to FIG. 2. That is, a user selects a system suspend to RAM sleeping state at step 410. At step 420, the components in the computer system are directed to prepare to enter a suspend to disc sleeping state. At step 430, a context file is written and saved to non-volatile storage.

Contrary to the method 200 described with regard to FIG. 2, at the next step, step 440, the computer system may complete any other operations necessary to effectuate a transition to a suspend to disc sleeping state short of notifying the BIOS to effectuate the transition or effectuating the transition in hardware. At step 450, the device drivers for the system components may be directed to wake to a working state. At this point, the system may be placed in a special mode during which no further changes will be saved to non-volatile storage. In this way, the context file saved to non-volatile storage appropriately reflects the system state. After waking to a working state, the device drivers may be directed, at step 460, to prepare for a transition to the suspend to RAM sleeping state selected in step 410. The drivers may save state appropriate for the selected sleeping state, as may the operating system. At step 470, the BIOS or other firmware or hardware may be notified to transition to the suspend to RAM sleeping state selected in step 410, and may effectuate the transition. At step 480, a wake event may occur, waking the system from the suspend to RAM sleeping state to a working state.

It will be recognized that the method 300 for transitioning back to a suspend to RAM sleeping state after power is regained after having been lost while in the suspend to RAM sleeping state is also applicable to a system that had been transitioned to a suspend to RAM sleeping state according to the method 400.

It will be understood that the invention includes other alternative embodiments not specifically disclosed herein in addition to those described with regard to FIGS. 3A, 3B and 4. For example, in an alternative embodiment, the device drivers are notified that the system will be transitioning to a suspend to disc sleeping state, and then, after saving a context file to non-volatile storage, the system transitions to a suspend to RAM sleeping state without providing further notification to the drivers. Alternatively, the device drivers are notified that the system is transitioning to a suspend to RAM sleeping state, and then after writing and saving a system context file in non-volatile storage, the system transitions to the suspend to RAM sleeping state. In still another alternative embodiment, some device drivers (e.g., enlightened device drivers) are notified of a transition to a suspend to RAM sleeping state, and other drivers are notified of a transition to a suspend to disc sleeping state. A system context file is written and stored in non-volatile storage, and the system subsequently transitions to a suspend to RAM sleeping state.

It is understood that device drivers may be notified of a transition to a suspend to RAM sleeping state that may be different from the suspend to RAM sleeping state to which the system actually transitions. For example, some or all drivers may be notified of a pending transition to a sleeping state S2 and the system may subsequently transition to a sleeping state S3.

The methods of the present invention may be implemented in hardware, software or, where appropriate, a combination of both. Thus, the methods and apparatus of the present invention, or certain aspects or portions thereof, may take the form of program code (i.e., instructions) embodied in computer readable medium. A processor that executes program code for performing the steps of the methods of the invention, as described in FIGS. 2, 3, and 4 and as claimed, constitute a computer system that embodies the present invention. In the case of program code execution on programmable computers, the computing device will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the specific examples in conjunction with the various figures, it is to be understood that other embodiments may be used or modifications and additions may be made to the described embodiments for performing the same function of the present invention without deviating therefrom. The examples are offered in explanation of the invention and are in no way intended to limit the scope of the invention as defined in the claims. In summary, in no way is the present invention limited to the examples provided and described herein. Therefore, the present invention should not be limited to any single embodiment, but rather should be construed in breadth and scope in accordance with the appended claims.

What is claimed:

1. A method, comprising:
saving information indicative of an operating state of a computer system comprising a volatile storage medium to a non-volatile storage medium;
transitioning the computer system to a first sleeping state that maintains power to the volatile storage medium; and, in response to restoration of power following loss of power while in the first sleeping state or a subsequently entered sleeping state,
recovering from the loss of power by restoring the computer system to the operating state using the information indicative of the state saved to the non-volatile storage medium; and
notifying a component of the computer system before transitioning to the first sleeping state that the computer system will be transitioning to a second sleeping state, wherein power to the volatile storage medium is off during the second sleeping state.

2. The method of claim 1, wherein the transitioning comprises executing program code in a firmware.

3. The method of claim 2, wherein the firmware is a BIOS.

4. The method of claim 1, wherein the transitioning comprises interacting with hardware to cause the computer system to transition.

5. The method of claim 1, further comprising:
resuming the computer system to a working state; and
notifying the component that the computer system will transition to the first sleeping state.

6. The method of claim 1, wherein the second sleeping state is a system S4 sleeping state.

7. The method of claim 1, further comprising:
notifying a component of the computer system that the computer system will be transitioning to the first sleeping state; and
notifying the component that, if power is lost after transitioning to the first sleeping state, it should be prepared to resume to a working state when power is regained.

8. The method of claim 1, wherein the non-volatile storage medium comprises non-volatile RAM.

9. The method of claim 1, further comprising:
removing the power to RAM while remaining in the first sleeping state after a predetermined time period of inactivity has elapsed.

10. The method of claim 9, further comprising:
determining when a scheduled activity is to be performed prior to directing a firmware to transition the computer system to the first sleeping state; and
determining the predetermined time period based on the scheduled activity.

11. The method of claim 1, wherein the first state comprises a system S1, a system S2, or a system S3 sleeping state.

12. The method of claim 1, wherein restoring the computer system to the operating state comprises:
reading the system state data from the non-volatile storage medium; and
resuming to a working state.

13. A computer-readable medium having program code stored thereon that, when executed by a computer system, causes the computer system to:
save information indicative of an operating state of a computer system comprising a volatile storage medium to a non-volatile storage medium;
transition the computer system to a first sleeping state that maintains power to the volatile storage medium: and, in response to restoration of power following loss of power while in the first sleeping state or a subsequently entered sleeping state,
recover from the loss of power by restoring the computer system to the operating state using the information indicative of the state saved to the non-volatile storage medium; and
notify a component of the computer system before transitioning to the first sleeping state that the computer system will be transitioning to a second sleeping state, wherein power to the volatile storage medium is off during the second sleeping state.

14. The computer-readable medium of claim 13, having further program code stored thereon that, when executed by the computer system, causes the computer system to:
resume the computer system to a working state; and
notify the component that the computer system will transition to the first sleeping state.

15. The computer-readable medium of claim 13, having further program code stored thereon that, when executed by the computer system, causes the computer system to:
notify a component of the computer system that the computer system will be transitioning to the first sleeping state; and
notify the component that, if power is lost after transitioning to the first sleeping state, it should be prepared to resume to a working state when power is regained.

16. A computer system, comprising:
means for saving information indicative of an operating state of a computer system comprising a volatile storage medium to a non-volatile storage medium;
means for transitioning the computer system to a first sleeping state that maintains power to the volatile storage medium; and, in response to restoration of power following loss of power while in the first sleeping state or a subsequently entered sleeping state,
means for recovering from the loss of power by restoring the computer system to the operating state using the information indicative of the state saved to the non-volatile storage medium; and
means for notifying a component of the computer system before transitioning to the first sleeping state that the computer system will be transitioning to a second sleeping state, wherein power to the volatile storage medium is off during the second sleeping state.

17. The computer system of claim 16, further comprising:
means for resuming the computer system to a working state; and
means for notifying the component that the computer system will transition to the first sleeping state.

* * * * *

UNITED STATES PATENT AND TRADEMARK OFFICE
CERTIFICATE OF CORRECTION

| | | |
|---|---|---|
| PATENT NO. | : 7,373,530 B2 | Page 1 of 1 |
| APPLICATION NO. | : 11/083256 | |
| DATED | : May 13, 2008 | |
| INVENTOR(S) | : Nicholas Stephen Judge et al. | |

It is certified that error appears in the above-identified patent and that said Letters Patent is hereby corrected as shown below:

In Face page, in field (54), under "Title" column 1, line 3, delete "COMPUTERS" and insert -- COMPUTER --, therefor.

In column 1, line 3, delete "COMPUTERS" and insert -- COMPUTER --, therefor.

In column 12, line 8, in Claim 13, delete "medium: and," and insert -- medium; and, --, therefor.

Signed and Sealed this
Twenty-sixth Day of April, 2011

David J. Kappos
*Director of the United States Patent and Trademark Office*